(12) United States Patent
Nishikawa

(10) Patent No.: US 11,546,003 B2
(45) Date of Patent: Jan. 3, 2023

(54) RADIO FREQUENCY MODULE AND COMMUNICATION DEVICE

(71) Applicant: Murata Manufacturing Co., Ltd., Nagaokakyo (JP)

(72) Inventor: Hiroshi Nishikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/179,401

(22) Filed: Feb. 19, 2021

(65) Prior Publication Data
US 2021/0266018 A1 Aug. 26, 2021

(30) Foreign Application Priority Data
Feb. 25, 2020 (JP) .............................. JP2020-029831

(51) Int. Cl.
*H04B 1/00* (2006.01)
*H04B 1/04* (2006.01)
*H04B 1/40* (2015.01)

(52) U.S. Cl.
CPC ........... *H04B 1/006* (2013.01); *H04B 1/0078* (2013.01); *H04B 1/04* (2013.01); *H04B 2001/0408* (2013.01)

(58) Field of Classification Search
CPC ........ H04B 1/006; H04B 1/0078; H04B 1/03; H04B 1/04; H04B 1/0475; H04B 1/38; H04B 1/40; H01L 23/48; H01L 23/4825; H01L 23/49822; H01L 23/5383; H01L 2224/16235; H01L 2924/3025; H04W 88/02; H04W 88/06
See application file for complete search history.

(56) References Cited

U.S. PATENT DOCUMENTS

| | | | | |
|---|---|---|---|---|
| 7,363,017 | B2* | 4/2008 | Miya | H01L 23/3135 455/341 |
| 7,944,058 | B2* | 5/2011 | Ishihara | H01L 23/49838 257/737 |
| 8,432,033 | B2* | 4/2013 | Shinohara | H01L 23/49861 257/737 |
| 9,351,404 | B2* | 5/2016 | Satake | H01L 23/66 |
| 10,192,827 | B2* | 1/2019 | Matsui | H03F 3/21 |

(Continued)

FOREIGN PATENT DOCUMENTS

| | | |
|---|---|---|
| JP | 2006-166277 A | 6/2006 |
| JP | 2011-40602 A | 2/2011 |
| KR | 10-2019-0073486 A | 6/2019 |

OTHER PUBLICATIONS

Korean Office Action dated Oct. 28, 2022, in corresponding Korean Patent Application No. 10-2021-0018796.

*Primary Examiner* — Quochien B Vuong
(74) *Attorney, Agent, or Firm* — Xsensus LLP

(57) ABSTRACT

A radio frequency module includes: a module substrate including a first principal surface and a second principal surface opposite to each other; a plurality of external-connection terminals (e.g., a plurality of post electrodes) disposed on the second principal surface; a semiconductor component disposed on the second principal surface and including a first low-noise amplifier and/or a second low-noise amplifier; and a metal member set at a ground potential and covering at least part of a surface of the semiconductor component, the surface being opposite to a surface that faces the module substrate.

18 Claims, 6 Drawing Sheets

(56) References Cited

U.S. PATENT DOCUMENTS

| | | | | |
|---|---|---|---|---|
| 10,297,913 B2* | 5/2019 | Khoury | .................. | H01Q 1/526 |
| 2004/0232982 A1* | 11/2004 | Ichitsubo | ................ | H01L 23/66 |
| | | | | 330/129 |

* cited by examiner

FIG. 2
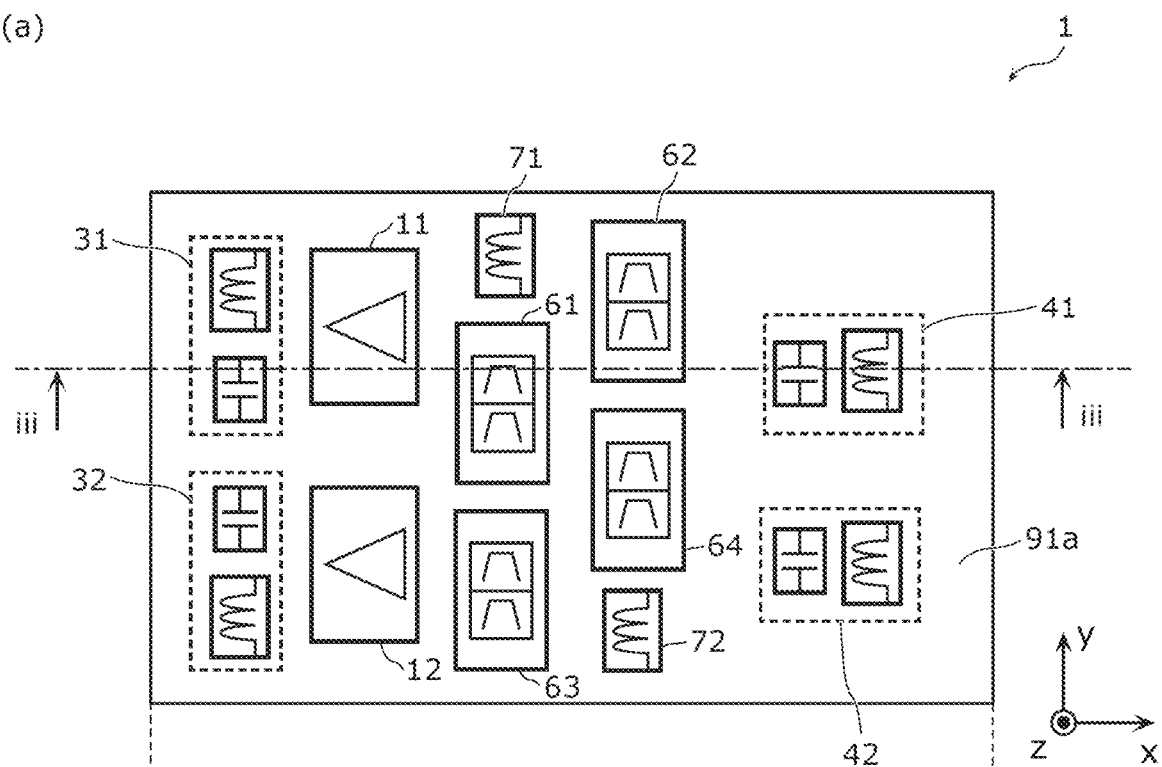
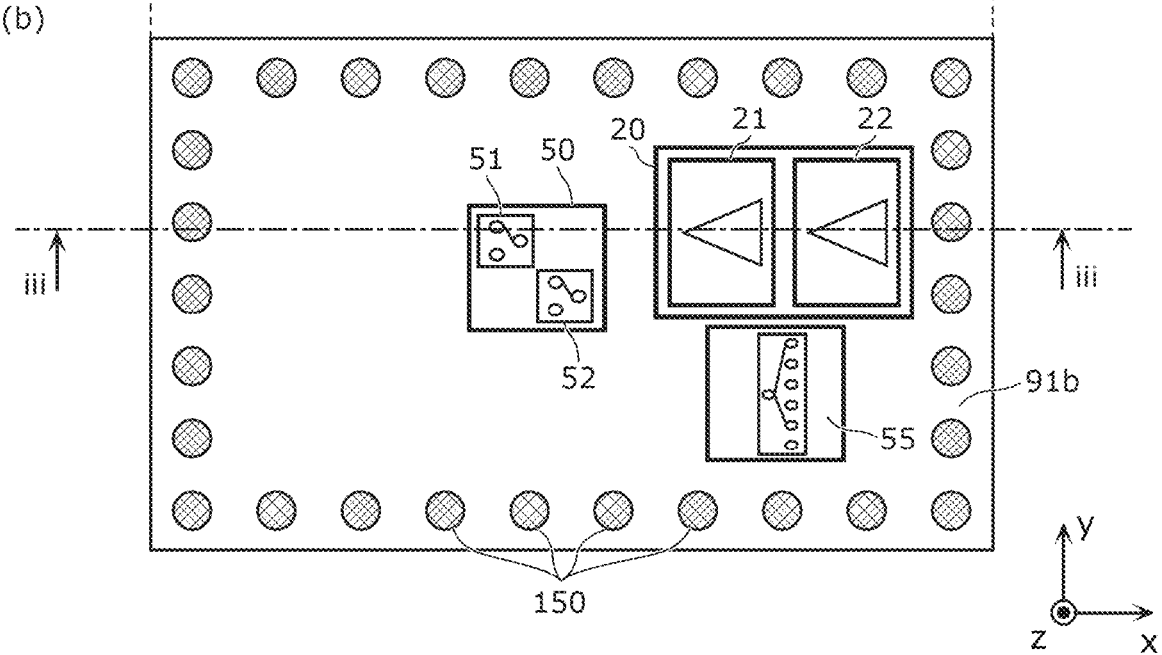

RADIO FREQUENCY MODULE AND COMMUNICATION DEVICE

CROSS REFERENCE TO RELATED APPLICATION

The present application is based on and claims priority to Japanese Patent Application No. 2020-029831 filed on Feb. 25, 2020. The entire disclosure of the above-identified application, including the specification, drawings and claims is incorporated herein by reference in its entirety.

TECHNICAL FIELD

The present disclosure relates to a radio frequency module and a communication device.

BACKGROUND

In mobile communication devices such as mobile phones, the number of circuit elements included in radio frequency front-end circuits increases with the progress particularly in multiband communications. Against this backdrop, it is increasingly difficult to reduce the size of radio frequency modules.

Japanese Unexamined Patent Application Publication No. 2011-040602 discloses a semiconductor module including a double-sided mounting substrate which enables the downsizing of the module.

SUMMARY

Technical Problems

However, as recognized by the present inventor, the semiconductor module according to such conventional technology fails in some cases to provide a sufficient shielding effect for a radio frequency component mounted on the double-sided mounting substrate.

In view of the above, the present disclosure provides a radio frequency module and a communication device capable of improving the shielding effect for a radio frequency component mounted on a double-sided mounting substrate.

Solutions

The radio frequency module according to an aspect of the present disclosure includes: a module substrate including a first principal surface and a second principal surface opposite to each other; a plurality of external-connection terminals disposed on the second principal surface; a semiconductor component disposed on the second principal surface and including a low-noise amplifier; and a metal member set at a ground potential and covering at least part of a surface of the semiconductor component, the surface being opposite to a surface that faces the module substrate.

Advantageous Effects

The present disclosure is capable of improving the shielding effect for a radio frequency component mounted on a double-sided mounting substrate.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a plan view of the radio frequency module according to Embodiment 1.

DESCRIPTION OF EMBODIMENTS

Figure 1:
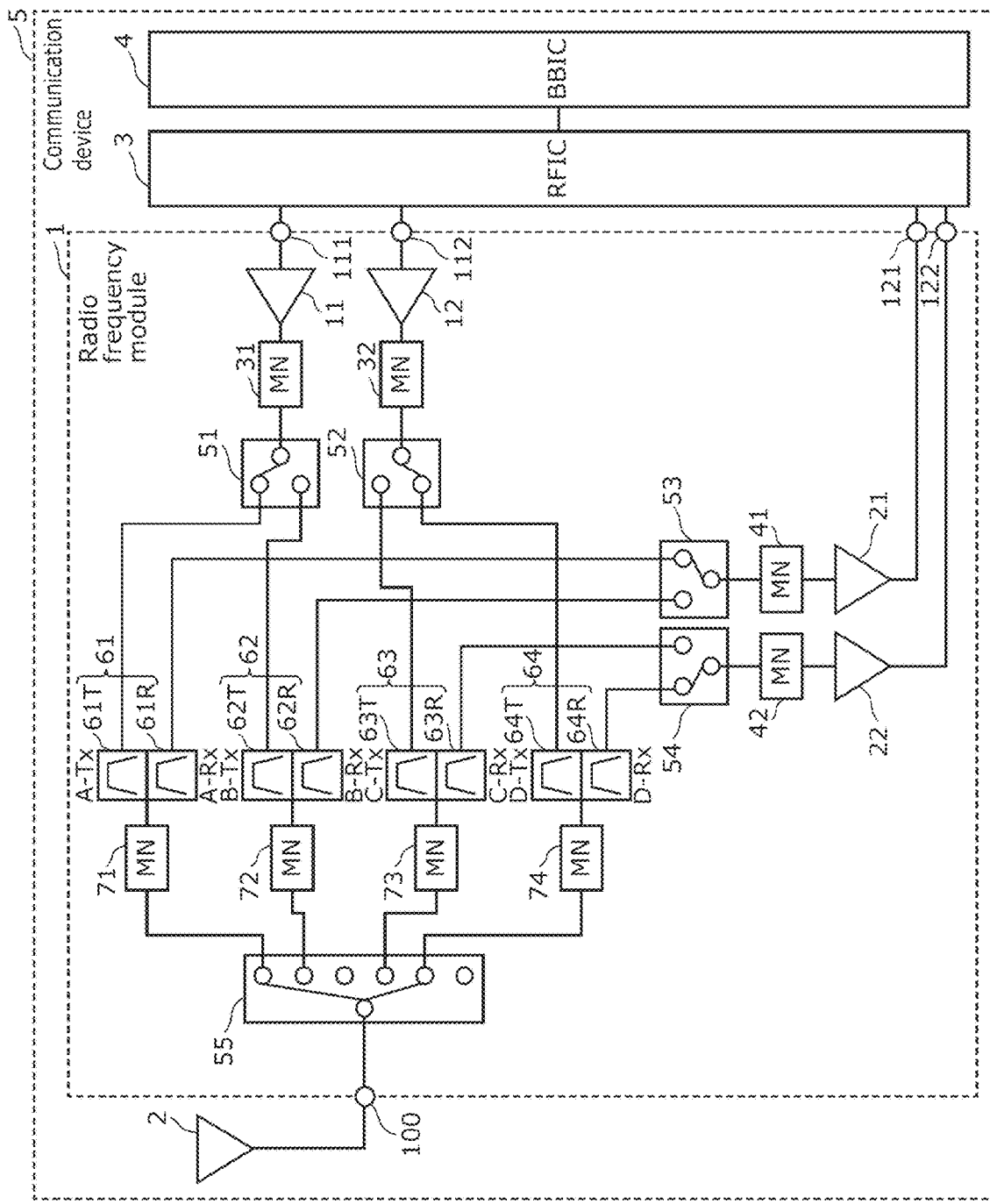
FIG. 1 is a diagram showing the circuit configurations of a radio frequency module and a communication device according to Embodiment 1.

The following describes in detail the embodiments according to the present disclosure with reference to the drawings. Note that the following embodiments show a comprehensive or specific example of the present disclosure. The numerical values, shapes, materials, structural elements, the arrangement and connection of the structural elements, etc. shown in the following embodiments are mere examples, and thus are not intended to limit the present disclosure.

Note that the drawings are schematic diagrams in which emphasis, omission, or ratio adjustment has been applied where necessary to illustrate the present disclosure. The drawings are thus not necessarily exact illustration of the present disclosure, and may illustrate shapes, positional relationships, and ratios differently from the actual ones. In the drawings, substantially the same structural elements are assigned the same reference marks, and their repetitive description may be omitted or simplified.

In the drawings, the x axis and the y axis are orthogonal to each other on a plane that is parallel to a principal surface of a module substrate. Also, the z axis is normal to a principal surface of the module substrate. The positive direction and the negative direction of the z axis indicate the upward direction and the downward direction, respectively.

In the present disclosure, a communication system means a communication system that is configured using a radio access technology (RAT) defined by, for example, a standard body, etc. such as the 3rd Generation Partnership Project (3GPP) and Institute of Electrical and Electronics Engineers (IEEE). Non-limiting examples of a communication system to be used include a 5th Generation New Radio (5G NR) system, a Long Term Evolution (LTE) system, and a Wireless Local Area Network (WLAN) system.

Also, a communication band means a frequency band that is predefined by a standard body, etc. for a communication system. Non-limiting examples of a communication band to be used include a 5GNR frequency band, an LTE frequency band, and a WLAN channel.

Embodiment 1

1 Circuit Configurations of Radio Frequency Module 1 and Communication Device 5

With reference to FIG. 1, the following describes the circuit configurations of radio frequency module 1 and communication device 5 according to the present embodiment. FIG. 1 is a diagram showing the circuit configurations of radio frequency module 1 and communication device 5 according to Embodiment 1.

In the following description of the circuit configurations, "connected" means not only the case where elements are electrically connected via a wiring conductor, a terminal, a connector, a switch, or any combination of these, but also the case where elements are electrically connected via a passive element and/or an active element. Also, "connected between A and B" means that an element is disposed on a path that connects A and B and connected to both A and B.

[1.1 Circuit Configuration of Communication Device 5]

Communication device 5 is a device used in a communication system. Examples of communication device 5 include a smartphone and a tablet computer. As shown in FIG. 1, communication device 5 includes radio frequency module 1, antenna 2, RFIC 3, and BBIC 4.

Antenna 2 is connected to antenna connection terminal 100 of radio frequency module 1. Antenna 2 transmits a radio frequency signal outputted from radio frequency module 1. Antenna 2 also receives a radio frequency signal from outside and outputs the received radio frequency signal to radio frequency module 1.

RFIC 3 is an exemplary signal processing circuit that processes a radio frequency signal outputted from radio frequency module 1. RFIC 3 processes a radio frequency signal which is to be transmitted or has been received by antenna 2. More specifically, RFIC 3 performs signal processing, such as down-conversion, on a radio frequency reception signal inputted via a reception signal path of radio frequency module 1, and outputs the resulting reception signal to BBIC 4. RFIC 3 also performs signal processing, such as up-conversion, on a transmission signal inputted from BBIC 4, and outputs the resulting radio frequency transmission signal to a transmission signal path of radio frequency module 1.

RFIC 3 is also implemented as a controller that controls radio frequency module 1. More specifically, the controller transfers, to radio frequency module 1, a control signal for switching between connecting the switches included in radio frequency module 1. The controller also transfers, to radio frequency module 1, a control signal for adjusting the gains, etc. of power amplifiers and low-noise amplifiers included in radio frequency module 1. Note that the controller may be provided outside of RFIC 3, and may thus be provided in, for example, BBIC 4.

BBIC 4 is a circuit that performs signal processing by use of an intermediate frequency band, the frequency of which is lower than that of a radio frequency signal propagating through radio frequency module 1. Used as the signal processed by BBIC 4 is, for example, an image signal for image display, or a sound signal for telephone conversation through a speaker.

Note that antenna 2 and BBIC 4 are not essential structural elements of communication device 5 according to the present embodiment.

[1.2 Circuit Configuration of Radio Frequency Module 1]

The following describes a detailed configuration of radio frequency module 1. As shown in FIG. 1, radio frequency module 1 includes power amplifiers 11 and 12, low-noise amplifiers 21 and 22, transmission filters 61T through 64T, reception filters 61R through 64R, matching circuits 31, 32, 41, 42, and 71 through 74, and switches 51 through 55.

Power amplifier 11 amplifies radio frequency signals in communication band A and communication band B that belong to a first frequency band group. The input terminal of power amplifier 11 is connected to transmission input terminal 111, and the output terminal of power amplifier 11 is connected to matching circuit 31.

Power amplifier 12 amplifies radio frequency signals in communication band C and communication band D that belong to a second frequency band group. The second frequency band group is a group of frequency bands located at the lower-frequency side than the frequency bands belonging to the first frequency band group. The input terminal of power amplifier 12 is connected to transmission input terminal 112, and the output terminal of power amplifier 12 is connected to matching circuit 32.

Low-noise amplifier 21 performs low-noise amplification on radio frequency signals in communication band A and communication band B. The input terminal of low-noise amplifier 21 is connected to matching circuit 41, and the output terminal of low-noise amplifier 21 is connected to reception output terminal 121.

Low-noise amplifier 22 performs low-noise amplification on radio frequency signals in communication band C and communication band D. The input terminal of low-noise amplifier 22 is connected to matching circuit 42, and the output terminal of low-noise amplifier 22 is connected to reception output terminal 122.

Transmission filter 61T is disposed on transmission path AT that connects power amplifier 11 and antenna connection terminal 100. Transmission filter 61T passes radio frequency signals in the uplink band of communication band A among the radio frequency signals amplified by power amplifier 11.

Transmission filter 62T is disposed on transmission path BT that connects power amplifier 11 and antenna connection terminal 100. Transmission filter 62T passes radio frequency signals in the uplink band of communication band B among the radio frequency signals amplified by power amplifier 11.

Transmission filter 63T is disposed on transmission path CT that connects power amplifier 12 and antenna connection terminal 100. Transmission filter 63T passes radio frequency signals in the uplink band of communication band C among the radio frequency signals amplified by power amplifier 12.

Transmission filter 64T is disposed on transmission path DT that connects power amplifier 12 and antenna connection terminal 100. Transmission filter 64T passes radio frequency signals in the uplink band of communication band D among the radio frequency signals amplified by power amplifier 12.

Reception filter 61R is disposed on reception path AR that connects low-noise amplifier 21 and antenna connection terminal 100. Reception filter 61R passes radio frequency signals in the downlink band of communication band A among the radio frequency signals inputted from antenna connection terminal 100.

Reception filter 62R is disposed on reception path BR that connects low-noise amplifier 21 and antenna connection terminal 100. Reception filter 62R passes radio frequency signals in the downlink band of communication band B among the radio frequency signals inputted from antenna connection terminal 100.

Reception filter 63R is disposed on reception path CR that connects low-noise amplifier 22 and antenna connection terminal 100. Reception filter 63R passes radio frequency signals in the downlink band of communication band C among the radio frequency signals inputted from antenna connection terminal 100.

Reception filter 64R is disposed on reception path DR that connects low-noise amplifier 22 and antenna connection terminal 100. Reception filter 64R passes radio frequency signals in the downlink band of communication band D among the radio frequency signals inputted from antenna connection terminal 100.

Transmission filter 61T and reception filter 61R are included in duplexer 61, the passband of which is communication band A. Transmission filter 62T and reception filter 62R are included in duplexer 62, the passband of which is communication band B. Transmission filter 63T and reception filter 63R are included in duplexer 63, the passband of which is communication band C. Transmission filter 64T and reception filter 64R are included in duplexer 64, the passband of which is communication band D.

Non-limiting examples of each of these transmission filters 61T through 64T and reception filers 61R through 64R include a surface acoustic wave filter, an acoustic wave filter utilizing bulk acoustic wave (BAW), an LC resonant filter, and a dielectric filter.

Matching circuit 31 is connected between power amplifier 11 and transmission filters 61T and 62T. Matching circuit 31 matches the impedance between power amplifier 11 and transmission filters 61T and 62T.

Matching circuit 32 is connected between power amplifier 12 and transmission filters 63T and 64T. Matching circuit 32 matches the impedance between power amplifier 12 and transmission filters 63T and 64T.

Matching circuit 41 is connected between low-noise amplifier 21 and reception filters 61R and 62R. Matching circuit 41 matches the impedance between low-noise amplifier 21 and reception filters 61R and 62R.

Matching circuit 42 is connected between low-noise amplifier 22 and reception filters 63R and 64R. Matching circuit 42 matches the impedance between low-noise amplifier 22 and reception filters 63R and 64R.

Switch 51 is connected between matching circuit 31 and transmission filters 61T and 62T. Switch 51 switches between connecting power amplifier 11 and transmission filter 61T and connecting power amplifier 11 and transmission filter 62T. More specifically, switch 51 includes, for example, a common terminal connected to matching circuit 31, a first terminal connected to transmission filter 61T, and a second terminal connected to transmission filter 62T. Having such connection structure, switch 51 connects one of the first terminal and the second terminal to the common terminal on the basis of, for example, a control signal from RFIC 3. This configuration enables to switch between connecting power amplifier 11 and transmission filter 61T and connecting power amplifier 11 and transmission filter 62T. Switch 51 is implemented, for example, as a single pole double throw (SPDT) switch circuit.

Switch 52 is connected between matching circuit 32 and transmission filters 63T and 64T. Switch 52 switches between connecting power amplifier 12 and transmission filter 63T and connecting power amplifier 12 and transmission filter 64T. More specifically, switch 52 includes, for example, a common terminal connected to matching circuit 32, a first terminal connected to transmission filter 63T, and a second terminal connected to transmission filter 64T. Having such connection structure, switch 52 connects one of the first terminal and the second terminal to the common terminal on the basis of, for example, a control signal from RFIC 3. This configuration enables to switch between connecting power amplifier 12 and transmission filter 63T and connecting power amplifier 12 and transmission filter 64T. Switch 52 is implemented, for example, as an SPDT switch circuit.

Switch 53 is connected between matching circuit 41 and reception filters 61R and 62R. Switch 53 switches between connecting low-noise amplifier 21 and reception filter 61R and connecting low-noise amplifier 21 and reception filter 62R. More specifically, switch 53 includes, for example, a common terminal connected to matching circuit 41, a first terminal connected to reception filter 61R, and a second terminal connected to reception filter 62R. Having such connection structure, switch 53 connects one of the first terminal and the second terminal to the common terminal on the basis of, for example, a control signal from RFIC 3. This configuration enables to switch between connecting low-noise amplifier 21 and reception filter 61R and connecting low-noise amplifier 21 and reception filter 62R. Switch 53 is implemented, for example, as an SPDT switch circuit.

Switch 54 is connected between matching circuit 42 and reception filters 63R and 64R. Switch 54 switches between connecting low-noise amplifier 22 and reception filter 63R and connecting low-noise amplifier 22 and reception filter 64R. More specifically, switch 54 includes, for example, a common terminal connected to matching circuit 42, a first terminal connected to reception filter 63R, and a second terminal connected to reception filter 64R. Having such connection structure, switch 54 connects one of the first terminal and the second terminal to the common terminal on the basis of, for example, a control signal from RFIC 3. This configuration enables to switch between connecting low-noise amplifier 22 and reception filter 63R and connecting low-noise amplifier 22 and reception filter 64R. Switch 54 is implemented, for example, as an SPDT switch circuit.

Switch 55 is connected between antenna connection terminal 100 and transmission filters 61T through 64T, and between antenna connection terminal 100 and reception filters 61R through 64R. Switch 55 switches (1) a connection of antenna connection terminal 100 between transmission filter 61T and reception filter 61R, (2) a connection of antenna connection terminal 100 between transmission filter 62T and reception filter 62R, (3) a connection of antenna connection terminal 100 between transmission filter 63T and reception filter 63R, and (4) a connection of antenna connection terminal 100 between transmission filter 64T and reception filter 64R. Switch 55 is implemented as a multi-connection switch circuit capable of simultaneously performing two or more connections of (1) through (4).

Matching circuit 71 is connected between switch 55 and transmission filter 61T and between switch 55 and reception filter 61R. Matching circuit 71 matches the impedance between switch 55 connected to antenna 2 and transmission filter 61T and reception filter 61R.

Matching circuit 72 is connected between switch 55 and transmission filter 62T and between switch 55 and reception filter 62R. Matching circuit 72 matches the impedance between switch 55 connected to antenna 2 and transmission filter 62T and reception filter 62R.

Matching circuit 73 is connected between switch 55 and transmission filter 63T and between switch 55 and reception filter 63R. Matching circuit 73 matches the impedance between switch 55 connected to antenna 2 and transmission filter 63T and reception filter 63R.

Matching circuit 74 is connected between switch 55 and transmission filter 64T and between switch 55 and reception filter 64R. Matching circuit 74 matches the impedance between switch 55 connected to antenna 2 and transmission filter 64T and reception filter 64R.

In radio frequency module 1 with the above configuration, power amplifier 11, matching circuit 31, switch 51, and transmission filters 61T and 62T are included in a first transmission circuit that outputs, to antenna connection terminal 100, radio frequency transmission signals in communication band A and communication band B. Power amplifier 12, matching circuit 32, switch 52, and transmission filters 63T and 64T are included in a second transmission circuit that outputs, to antenna connection terminal 100, radio frequency signals in communication band C and communication band D. The first transmission circuit and the second transmission circuit are included in a transmission circuit that outputs, to antenna connection terminal 100, radio frequency signals in communication bands A through D.

In radio frequency module 1 with the above configuration, low-noise amplifier 21, matching circuit 41, switch 53, and reception filters 61R and 62R are included in a first reception circuit that receives radio frequency signals in communication band A and communication band B from antenna 2 via antenna connection terminal 100. Low-noise amplifier 22, matching circuit 42, switch 54, and reception filters 63R and 64R are included in a second reception circuit that receives radio frequency reception signals in communication band C and communication band D from antenna 2 via antenna connection terminal 100. The first reception circuit and the second reception circuit are included in a reception circuit that receives, from antenna connection terminal 100, radio frequency signals in communication bands A through D.

Note that the second transmission circuit and the second reception circuit are, for example, circuits for transferring radio frequency signals in communication bands that belong to a low-band group. The low-band group is a frequency band group of a plurality of communication bands for the 4th Generation (4G) and the 5th Generation (5G). The frequency range of the low-band group is, for example, 1 GHz or lower. For example, the low-band group includes the following LTE communication bands: band B5 (uplink: 824-849 MHz, downlink: 869-894 MHz); band B8 (uplink: 880-915 MHz, downlink: 925-960 MHz); and band B28 (uplink: 703-748 MHz, downlink: 753-803 MHz).

The first transmission circuit and the first reception circuit are, for example, circuits for transferring radio frequency signals in communication bands that belong to a middle-band group. The middle-band group is a frequency band group of a plurality of communication bands for 4G and 5G. The middle-band group is a group of frequency bands located at the higher-frequency side than the frequency bands belonging to the low-band group. The middle-band group has the frequency range of, for example, 1.5-2.2 GHz. For example, the middle-band group includes the following LTE communication bands: band B1 (uplink: 1920-1980 MHz, downlink: 2110-2170 MHz); band B39 (1880-1920 MHz); and band B66 (uplink: 1710-1780 MHz, downlink: 2110-2200 MHz).

Alternatively, the first transmission circuit and the first reception circuit may be, for example, circuits for transferring transmission signals and reception signals in communication bands that belong to a high-band group. The high-band group is a frequency band group of a plurality of communication bands for 4G and 5G. The high-band group is a group of frequency bands located at the higher-frequency side than the frequency bands belonging to the middle-band group. The high-band group has the frequency range of, for example, 2.4-2.8 GHz. For example, the high-band group includes the following LTE communication bands: band B7 (uplink: 2500-2570 MHz, downlink: 2620-2690 MHz); and band B41 (2496-2690 MHz).

With the above circuit configuration, radio frequency module 1 according to the present embodiment is capable of performing at least one of simultaneous transmission, simultaneous reception, or simultaneous transmission and reception of a radio frequency signal in one of communication band A and communication band B and a radio frequency signal in one of communication band C and communication band D.

Note that the transmission circuit and the reception circuit may not be connected to antenna connection terminal 100 via switch 55. For example, the transmission circuit and the reception circuit may be connected to different antennas via different antenna connection terminals.

Also, the radio frequency module according to the present disclosure is simply required to include at least one low-noise amplifier (e.g., low-noise amplifier 21 or 22) without including the other circuit elements.

2 Component Disposition of Radio Frequency Module 1

Figure 3:
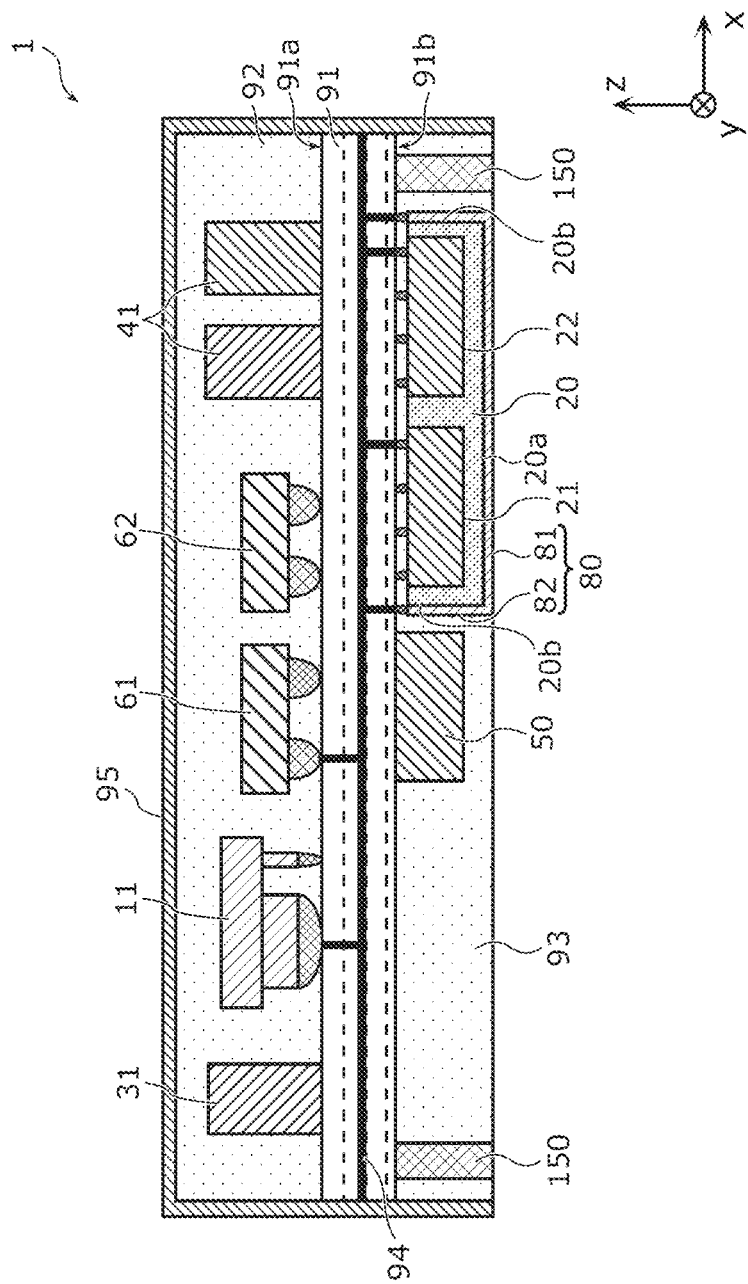
FIG. 3 is a cross-sectional view of the radio frequency module according to Embodiment 1.

With reference to FIG. 2 and FIG. 3, the following specifically describes the component disposition of radio frequency module 1 with the above configuration.

Note that in the following description of the component disposition, "in a plan view of the module substrate" means a view of an object that is orthographically projected onto the xy plane. Also, "a component is disposed on a principal surface of the module substrate" means not only the case where the component is disposed on the principal surface in contact with the principal surface of the module substrate, but also the cases where the component is disposed above the principal surface without contacting the principal surface and where the component is partially embedded in the substrate from the side of the principal surface.

FIG. 2 is a plan view of radio frequency module 1 according to Embodiment 1. In FIG. 2, (a) is a view of principal surface 91a of module substrate 91 seen from the positive direction of the z axis, and (b) is a perspective view of principal surface 91b of module substrate 91 seen from the positive direction of the z axis. FIG. 3 is a cross-sectional view of radio frequency module 1 according to Embodiment 1. FIG. 3 shows a cross-section of radio frequency module 1 cut along iii-iii line shown in FIG. 2.

Radio frequency module 1 according to the present embodiment is packaged by resin members 92 and 93 and shielded by shield electrode layer 95. Note that FIG. 2 omits the illustration of resin members 92 and 93, and shield electrode layer 95 to illustrate the components.

As shown in FIG. 2 and FIG. 3, radio frequency module 1 further includes metal member 80, module substrate 91, resin members 92 and 93, shield electrode layer 95, and a plurality of post electrodes 150, in addition to the electronic components that include the circuit elements shown in FIG. 1.

Module substrate 91, which is a double-sided mounting substrate, includes principal surfaces 91a and 91b opposite to each other. Components included in the transmission circuit and reception circuit described above are disposed on principal surfaces 91a and 91b. Non-limiting examples of module substrate 91 to be used include: a low temperature co-fired ceramics (LTCC) substrate including stacked dielectric layers; a high temperature co-fired ceramics (HTCC) substrate including stacked dielectric layers; a component-embedded substrate; a substrate having a redistribution layer (RDL); and a printed circuit board.

Ground conductor 94 is located in module substrate 91. Ground conductor 94 includes, for example, planar ground traces located inside of module substrate 91. Such planar ground traces are connected to some of post electrodes 150 and set at the ground potential.

Principal surface 91a of module substrate 91, which is an example of the first principal surface, is also referred to as an upper surface or a surface. As shown in (a) in FIG. 2, disposed on principal surface 91a are power amplifiers 11 and 12, matching circuits 31, 32, 41, 42, 71, and 72, and duplexers 61 through 64. As shown in FIG. 3, each of these components on principal surface 91a are sealed by resin member 92.

Each of matching circuits 31, 32, 41, 42, 71, and 72 includes an inductor and/or a capacitor. In FIG. 2, each of matching circuits 31, 32, 41, and 42 includes both an inductor and a capacitor. Meanwhile, each of matching circuits 71 and 72 includes an inductor without including a capacitor. Matching circuits 31, 32, 41, 42, 71, and 72 are not limited to having such configuration. For example, each of matching circuits 31, 32, 41, and 42 may include no capacitor, and each of matching circuits 71 and 72 may include a capacitor.

Principal surface 91b of module substrate 91, which is an example of the second principal surface, is also referred to as a lower surface or a back surface. As shown in (b) in FIG. 2, disposed on principal surface 91b are low-noise amplifiers 21 and 22, switches 51, 52, and 55, metal member 80, and a plurality of post electrodes 150. As shown in FIG. 3, these components on principal surface 91b are sealed by resin member 93.

Low-noise amplifiers 21 and 22 are included in a single semiconductor component 20, and switches 51 and 52 are included in a single semiconductor component 50. Semiconductor components 20 and 50, which are also referred to as semiconductor integrated circuits, are electronic circuits that are on a surface or inside of a semiconductor chip (also referred to as a die). Semiconductor components 20 and 50 may have, for example, a complementary metal oxide semiconductor (CMOS) structure. More specifically, semiconductor components 20 and 50 may be fabricated by a silicon on insulator (SOI) process. This enables a low-cost manufacture of the semiconductor components. Note that each of the semiconductor integrated circuits may include at least one of GaAs, SiGe, or GaN. This enables to provide low-noise amplifiers having high quality amplification properties and noise characteristics.

Metal member 80 covers at least part of semiconductor component 20. Metal member 20 comprises, for example, copper, gold, aluminum, or a metal that includes any combination of these metals. As shown in FIG. 3, metal member 80 is connected to ground conductor 94 on principal surface 91b of module substrate 91, and set at the ground potential.

Note that the position in which metal member 80 and ground conductor 94 are connected is not limited to a position on principal surface 91b. For example, metal member 80 may be connected to a ground electrode on the mother board (not illustrated) that is disposed at the negative side of the z axis of radio frequency module 1, thereby being set at the ground potential.

Resin member 92 is disposed on principal surface 91a of module substrate 91 and covers the circuit components on principal surface 91a. Resin member 93 is disposed on principal surface 91b of module substrate 91 and covers the circuit components on principal surface 91b. Resin members 92 and 93 are capable of ensuring the reliability of the circuit components on principal surfaces 91a and 91b, such as their mechanical strength and humidity resistance.

Resin member 93, a plurality of post electrodes 150, and metal member 80 are made flat, for example, by shaving the lower surface of radio frequency module 1, and a plurality of post electrodes 150 and metal member 80 are exposed from resin member 93.

Shield electrode layer 95 is a metal thin film formed, for example, by spattering. Shield electrode layer 95 covers the upper and side surfaces of resin members 92, side surfaces of module substrate 91, and side surfaces of resin member 93, and set at the ground potential. Note that shield electrode layer 95 cannot cover the lower surface of resin member 93. Shield electrode layer 95 is capable of inhibiting the entry of exogenous noise into the circuit components included in radio frequency module 1.

A plurality of post electrodes 150, which is an example of a plurality of external-connection terminals, are arranged along the periphery of principal surface 91b of module substrate 91. Each of a plurality of post electrodes 150 protrudes through resin member 93 from principal surface 91b in the negative direction of the z axis. One end of each of post electrodes 150 is exposed from resin member 93 and connected to an input-output terminal and/or a ground electrode, and so forth on the mother board that is disposed at the negative side of the z axis of radio frequency module 1.

Although not illustrated in FIG. 2 and FIG. 3, switches 53 and 54, and matching circuits 73 and 74 may be disposed on either principal surface 91a or 91b of module substrate 91, or inside of module substrate 91.

Also note that the radio frequency module according to the present disclosure may include at least module substrate 91, semiconductor component 20 that includes at least one of low-noise amplifier 21 or low-noise amplifier 22, metal member 80, and a plurality of post electrodes 150, without including the other components.

3 Configuration of Metal Member 80

Figure 4:
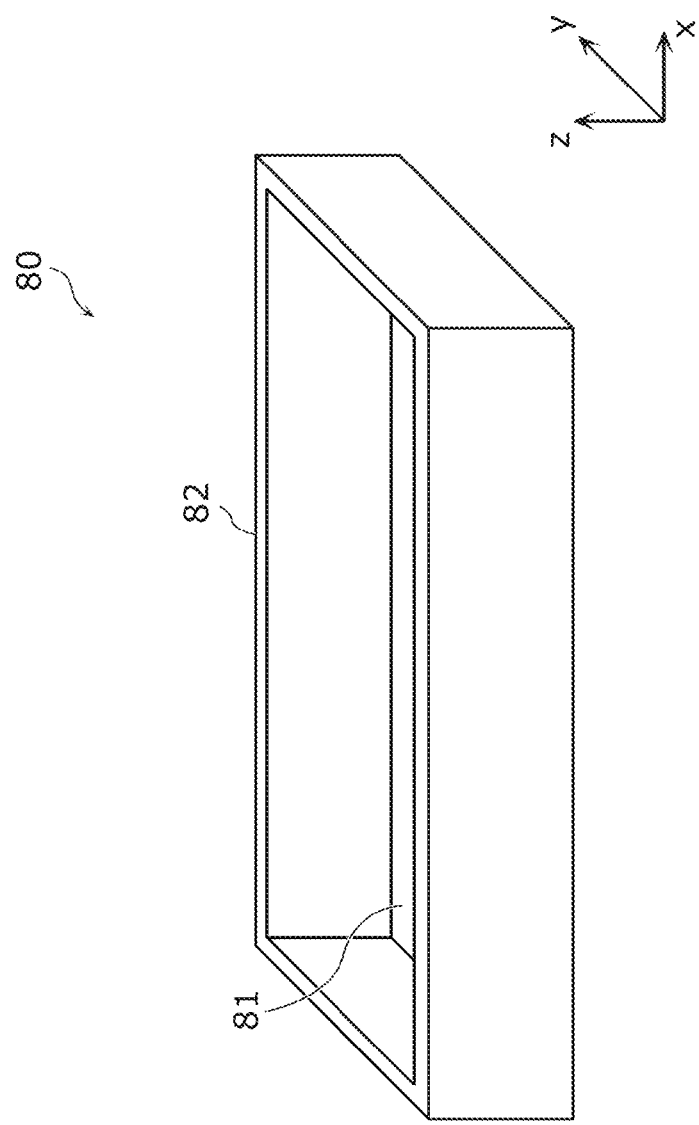
FIG. 4 is a perspective view of a metal member according to Embodiment 1.

With reference to FIG. 4, the following describes the configuration of metal member 80. FIG. 4 is a perspective view of metal member 80 according to the present embodiment. As shown in FIG. 4, metal member 80 includes base 81 and sides 82.

As shown in FIG. 3, base 81 at least partially covers that surface 20a of semiconductor component 20 which is opposite to the surface that faces module substrate 91. Semiconductor component 20 is disposed between base 81 and module substrate 91.

Note that base 81 according to the present embodiment, which is a rectangular plate, covers the entirety of surface 20a of semiconductor component 20, but the present disclosure is not limited to this configuration. Also, base 81 may not contact semiconductor component 20. Stated differently, base 81 may have any shape and may be disposed in any manner so long as base 81 covers at least part of surface 20a of semiconductor component 20.

Sides 82 are connected to base 81 and cover at least part of side surfaces 20b of semiconductor component 20. Sides 82 according to the present embodiment are walls that extend from base 81 toward principal surface 91b of module substrate 91 and that are disposed along side surfaces 20b of semiconductor component 20. The height of the walls is greater than the height of semiconductor component 20. For this reason, the top of each of the walls reaches principal surface 91b, thus enabling the walls to cover the entirety of side surfaces 20b of semiconductor component 20. The top of each of the walls is connected to ground conductor 94 on principal surface 91b.

Note that the height of the walls may be lower than the height of semiconductor component 20. Also, sides 82 may not cover the entirety of side surfaces 20b of semiconductor component 20. Stated differently, sides 82 may not surround semiconductor component 20 in a plan view of module substrate 91. Sides 82 may thus have, for example, an aperture at a position closer to shield electrode layer 95. Also in this case, metal member 80 and shield electrode layer 95 can cover semiconductor component 20.

4 Effects, Etc.

As described above, radio frequency module 1 according to the present embodiment includes: module substrate 91 including principal surface 91a and principal surface 91b opposite to each other; a plurality of external-connection terminals (e.g., a plurality of post electrodes 150) disposed on principal surface 91b; semiconductor component 20 disposed on principal surface 91b and including low-noise amplifier 21 and/or low-noise amplifier 22; and metal member 80 set at the ground potential and covering at least part of surface 20a of semiconductor component 20, surface 20a being opposite to the surface that faces module substrate 91.

In this configuration, metal member 80, which is set at the ground potential, covers at least part of surface 20a of semiconductor component 20 disposed on principal surface 91b of module substrate 91. This configuration thus enables metal member 80 to reduce exogenous noise emitted into semiconductor component 20 from below radio frequency module 1 (from the negative side of the z axis). Stated differently, this configuration increases the shielding effect for semiconductor component 20 that includes low-noise amplifier 21 and/or low-noise amplifier 22. This thus improves the electrical characteristics (e.g., noise figure (NF) characteristics) of radio frequency module 1, and increase in particular, its receiving sensitivity.

Also, in radio frequency module 1 according to the present embodiment, for example, metal member 80 may include: base 81 covering the at least part of surface 20a of semiconductor component 20, surface 20a being opposite to the surface that faces module substrate 91; and side 82 connected to base 81 and covering at least part of side surface 20b of semiconductor component 20.

In this configuration, base 81 of metal member 80 covers at least part of surface 20a of semiconductor component 20 and side 82 of metal member 80 covers at least part of side surface 20b of semiconductor component 20. This configuration thus further inhibits exogenous noise from entering semiconductor component 20 that includes low-noise amplifier 21 and/or low-noise amplifier 22.

Also, in radio frequency module 1 according to the present embodiment, for example, side 82 may be a wall extending from base 81 toward principal surface 91b and disposed along side surface 20b of semiconductor component 20.

In this configuration, the wall disposed along side surface 20b of semiconductor component 20 covers side surface 20b of semiconductor component 20 to inhibit exogeneous noise. This configuration thus further inhibits exogenous noise from entering semiconductor component 20 that includes low-noise amplifier 21 and/or low-noise amplifier 22.

Also, in radio frequency module 1 according to the present embodiment, for example, side 82 may be connected to ground conductor 94 on principal surface 91b.

In this configuration, ground conductor 94 and metal member 80 are connected on principal surface 91b of module substrate 91, thereby enabling metal member 80 to be set at the ground potential. This configuration thus enables metal member 80 to be connected to ground conductor 94 inside of radio frequency module 1, thus enhancing the flexibility in the disposition of metal member 80.

Also, radio frequency module 1 according to the present embodiment may further include, for example, resin member 93 disposed on principal surface 91b and sealing semiconductor component 20. Here, at least part of metal member 80 may be exposed from resin member 93.

This configuration enables resin member 93 to improve the mechanical strength, humidity resistance, etc. of the components on principal surface 91b. Further, with metal member 80 being exposed from resin member 93, an exposed portion of metal member 80 is connected to the ground conductor on the mother board, thereby stabilizing the ground potential of metal member 80.

Also, radio frequency module 1 according to the present embodiment may further include, shield electrode layer 95 covering principal surface 91a and a side surface of module substrate 91.

In this configuration, shield electrode layer 95 covers the upper and side surfaces of radio frequency module 1, thereby further inhibiting exogenous noise from entering semiconductor component 20 that includes low-noise amplifier 21 and/or low-noise amplifier 22 as well as exogenous noise from entering another component.

Also, radio frequency module 1 according to the present embodiment may further include, for example, power amplifier 11 and/or power amplifier 12 disposed on principal surface 91a.

In this configuration, power amplifier 11 and/or power amplifier 12, and low-noise amplifier 21 and/or low-noise amplifier 22 are disposed on the opposite sides of module substrate 91. This configuration achieves the downsizing of radio frequency module 1 and increases the isolation characteristics between power amplifier 11 and/or power amplifier 12, and low-noise amplifier 21 and/or low-noise amplifier 22.

Communication device 5 according to the preset embodiment includes: radio frequency module 1; and RFIC 3 that processes a radio frequency signal outputted from radio frequency module 1.

Communication device 5 with the above configuration achieves the same effects as those achieved by radio frequency module 1 described above.

Variation of Embodiment 1

Figure 5:
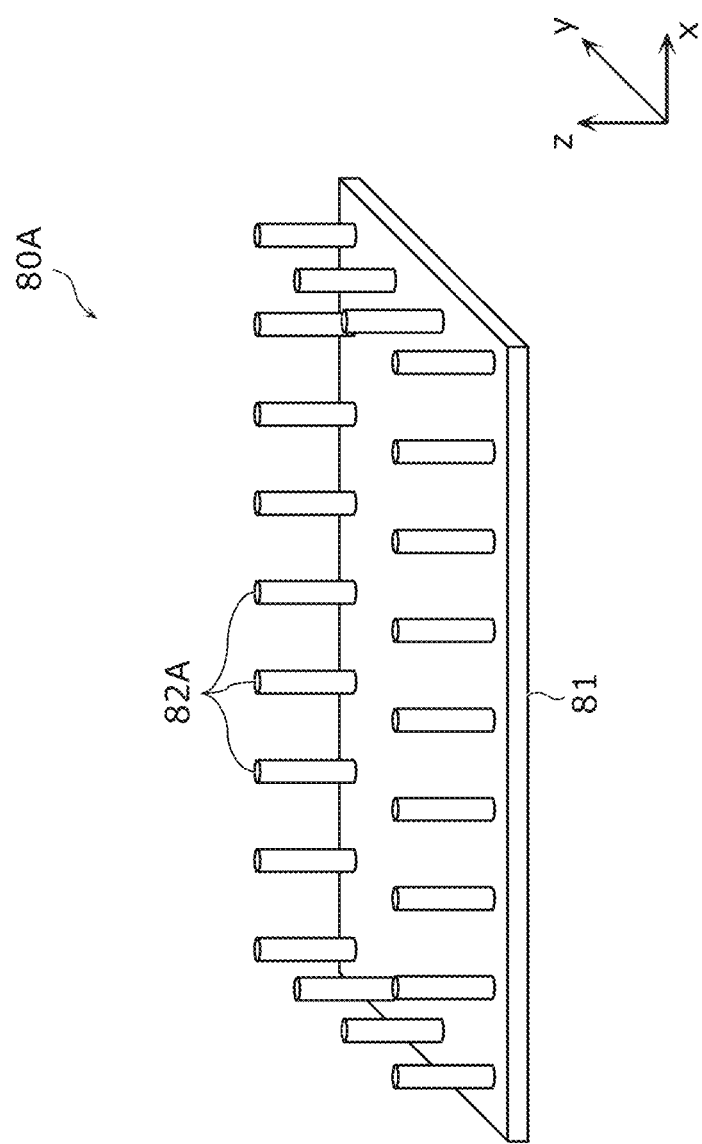
FIG. 5 is a perspective view of a metal member according to a variation of Embodiment 1.

The following describes a variation of Embodiment 1. The present variation is different from Embodiment 1 described above in the shape of the sides of the metal member. With reference to FIG. 5, the following focuses on the difference from Embodiment 1 to describe the present variation.

FIG. 5 is a perspective view of metal member 80A according to a variation of Embodiment 1. As shown in FIG. 5, metal member 80A according to the present variation includes base 81 and sides 82A.

Sides 82A are connected to base 81 and cover at least part of side surfaces 20b of semiconductor component 20. Sides 82A according to the present variation are a plurality of columns extending from base 81 toward principal surface 91b of module substrate 91 and disposed along the side surfaces 20b of semiconductor component 20. Each column, when in a greater height than the height of semiconductor component 20, can reach principal surface 91b at its top, but the height of each column is not limited to a particular height. In this case, the top of each column can be connected to ground conductor 94 on principal surface 91b.

In FIG. 5, each of a plurality of columns comprising sides 82A has a circular cylindrical shape, but the present disclosure is not limited to this. Each column may have, for example, a rectangular cylindrical shape.

As described above, in the present variation, sides 82A may be a plurality of columns extending from base 81 toward principal surface 91b and disposed along the side surface 20b of semiconductor component 20.

This configuration enables resin member 93 to enter through gaps between a plurality of columns, and thus to readily seal semiconductor component 20. Resin member 93 is thus capable of improving the mechanical strength, humidity resistance, etc. of semiconductor component 20 as well as the productivity of radio frequency module 1.

Embodiment 2

The following describes Embodiment 2. The present embodiment is different from Embodiment 1 described above mainly in that the radio frequency module includes a plurality of bump electrodes instead of a plurality of post electrodes. With reference to the drawings, the following focuses on the difference from Embodiment 1 to describe the present embodiment.

Figure 6:
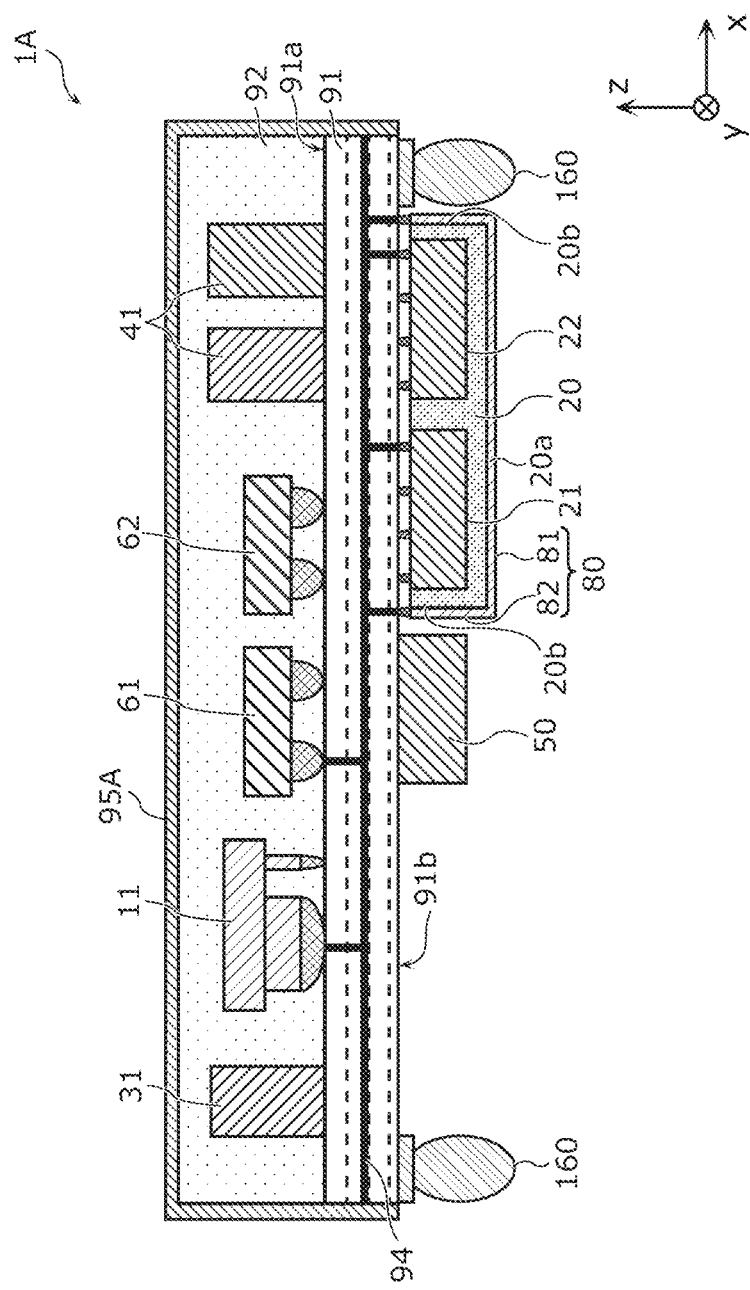
FIG. 6 is a cross-sectional view of a radio frequency module according to Embodiment 2.

The circuit configuration of radio frequency module 1A according to the present embodiment is the same as that of Embodiment 1, and thus the illustration and description thereof will be omitted. With reference to FIG. 6, the following specifically describes the component disposition of radio frequency module 1A.

FIG. 6 is a cross-sectional view of radio frequency module 1A according to Embodiment 2. As shown in FIG. 6, radio frequency module 1A according to the present embodiment includes a plurality of bump electrodes 160 instead of a plurality of post electrodes 150. Radio frequency module 1A according to the present embodiment may not include resin member 93 at the side of principal surface 91b.

As described above, radio frequency module 1A according to the present embodiment may include a plurality of bump electrodes 160 as a plurality of external-connection terminals.

Radio frequency module 1A with the above configuration is also capable of achieving the same effects as those achieved by Embodiment 1.

Another Embodiment

The radio frequency module and the communication device according to the present disclosure have been described above, using the embodiments, but the radio frequency module and the communication device according to the present disclosure are not limited to such embodiments. The present disclosure also includes: another embodiment achieved by freely combining structural elements in the embodiments; variations achieved by making various modifications to the embodiments that can be conceived by those skilled in the art without departing from the essence of the present disclosure; and various devices that include the radio frequency module and the communication device described above.

For example, in the circuit configurations of the radio frequency module and the communication device according to the foregoing embodiments, another circuit element, wiring, and so forth may be present in a path that connects each circuit element and a signal path disclosed in the drawings.

Also, the foregoing variation of Embodiment 1 may be applied to Embodiment 2.

The radio frequency module according to the foregoing embodiments includes the transmission circuit, but the present disclosure is not limited to this configuration. The radio frequency module may include the reception circuit without including the transmission circuit.

Metal member 80 or 80A in the foregoing embodiments includes sides 82 or sides 82A, but the present disclosure is not limited to this configuration. Stated differently, metal member 80 or 80A may include at least base 81, without including sides 82 or 82A. In this case, base 81 may be connected, for example, to surface 20a of semiconductor component 20.

Low-noise amplifiers 21 and 22 according to the foregoing embodiments are included in a single semiconductor component 20, but the present disclosure is not limited to this configuration. For example, low-noise amplifiers 21 and 22 may be included in different components. In this case, only one of the component of low-noise amplifier 21 and the component of low-noise amplifier 22 may be covered by metal member 80 or 80A, or each of the component of low-noise amplifier 21 and the component of low-noise amplifier 22 may be covered by metal member 80 or 80A.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable for use in a communication device (e.g., mobile phone) as a radio frequency module that is placed at the front-end portion.

The invention claimed is:
1. A radio frequency module, comprising
   a module substrate including a first principal surface and a second principal surface opposite to each other;
   a plurality of external-connection terminals disposed on the second principal surface;
   a semiconductor component disposed on the second principal surface and including a low-noise amplifier;
   a first switch disposed on the second principal surface;
   a second switch disposed on the second principal surface; and
   a metal member set at a ground potential and covering at least part of a first surface of the semiconductor component that is opposite to a second surface of the semiconductor component that faces the module substrate, wherein
   the metal member includes a side covering at least a part of a side surface of the semiconductor component, and
   the side of the metal member is disposed between the semiconductor component and the first switch and the second switch.
2. The radio frequency module of claim 1, wherein
   the metal member includes a base covering the at least part of the first surface of the semiconductor component.

3. The radio frequency module of claim 2, wherein the side of the metal member is connected to the base.

4. The radio frequency module of claim 3, wherein the side is a wall that extends from the base toward the second principal surface and is disposed along the side surface of the semiconductor component.

5. The radio frequency module of claim 3, wherein the side includes a plurality of columns that extend from the base toward the second principal surface and are disposed along the side surface of the semiconductor component.

6. The radio frequency module of claim 3, wherein the side is connected to a ground conductor on the second principal surface.

7. The radio frequency module of claim 1, further comprising:
a resin member disposed on the second principal surface that seals the semiconductor component, wherein
at least part of the metal member is exposed from the resin member.

8. The radio frequency module of claim 1, further comprising:
a shield electrode layer covering the first principal surface and a side surface of the module substrate.

9. The radio frequency module of claim 1, further comprising:
a power amplifier disposed on the first principal surface.

10. The radio frequency module of claim 1, wherein the semiconductor component includes at least a first low-noise amplifier.

11. The radio frequency module of claim 1, wherein the semiconductor component includes a plurality of low-noise amplifiers.

12. The radio frequency module of claim 1, wherein
the semiconductor component includes at least a first low-noise amplifier and a second low-noise amplifier,
the first switch is connected to the first low-noise amplifier and the second switch is connected to the second low-noise amplifier.

13. The radio frequency module of claim 1, wherein the plurality of external-connection terminals disposed on the second principal surface are a plurality of post electrodes.

14. The radio frequency module of claim 1, wherein the plurality of external-connection terminal disposed on the second principal surface are a plurality of bump electrodes.

15. A radio frequency module, comprising:
a module substrate including a first principal surface and a second principal surface opposite to each other;
a semiconductor component disposed on the second principal surface and including a low-noise amplifier;
a first switch disposed on the second principal surface;
a second switch disposed on the second principal surface; and
a metal member set at a ground potential and covering at least part of a first surface of the semiconductor component that is opposite to a second surface of the semiconductor component that faces the module substrate, wherein
the metal member includes a side connected to the base and covering at least part of a side surface of the semiconductor component, and
the side of the metal member is disposed between the semiconductor component and the first switch and the second switch.

16. The radio frequency module of claim 15, wherein
the metal member includes a base covering the first surface of the semiconductor component, wherein
the side is connected to the base.

17. The radio frequency module of claim 16, wherein
the side of the metal member includes a plurality of columns that extend from the base toward the principal surface and are disposed along the side surface of the semiconductor component.

18. A communication device, comprising:
a radio frequency module including
a module substrate including a first principal surface and a second principal surface opposite to each other;
a plurality of external-connection terminals disposed on the second principal surface;
a semiconductor component disposed on the second principal surface and including a low-noise amplifier;
a first switch disposed on the second principal surface;
a second switch disposed on the second principal surface;
a metal member set at a ground potential and covering at least part of a first surface of the semiconductor component that is opposite to a second surface of the semiconductor component that faces the module substrate, wherein
the metal member includes a side covering at least a part of a side surface of the semiconductor component, and
the side of the metal member is disposed between the semiconductor component and the first switch and the second switch;
and
a signal processing circuit configured to process a radio frequency signal output from the radio frequency module.

* * * * *